Nov. 11, 1958   H. A. SKOG   2,859,783
FRUIT PITTER HAVING SPIRAL KNIFE AND PIT RETAINING MEMBER
Filed Dec. 22, 1954   9 Sheets-Sheet 1

INVENTOR
HENRY A. SKOG
BY Moore, Prangley & Clayton
ATTORNEYS

INVENTOR
HENRY A. SKOG
ATTORNEYS

Nov. 11, 1958 H. A. SKOG 2,859,783
FRUIT PITTER HAVING SPIRAL KNIFE AND PIT RETAINING MEMBER
Filed Dec. 22, 1954 9 Sheets-Sheet 8
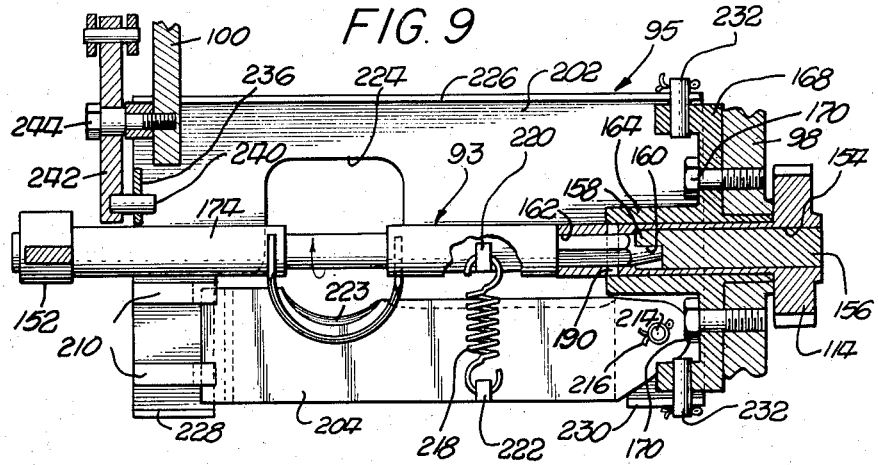
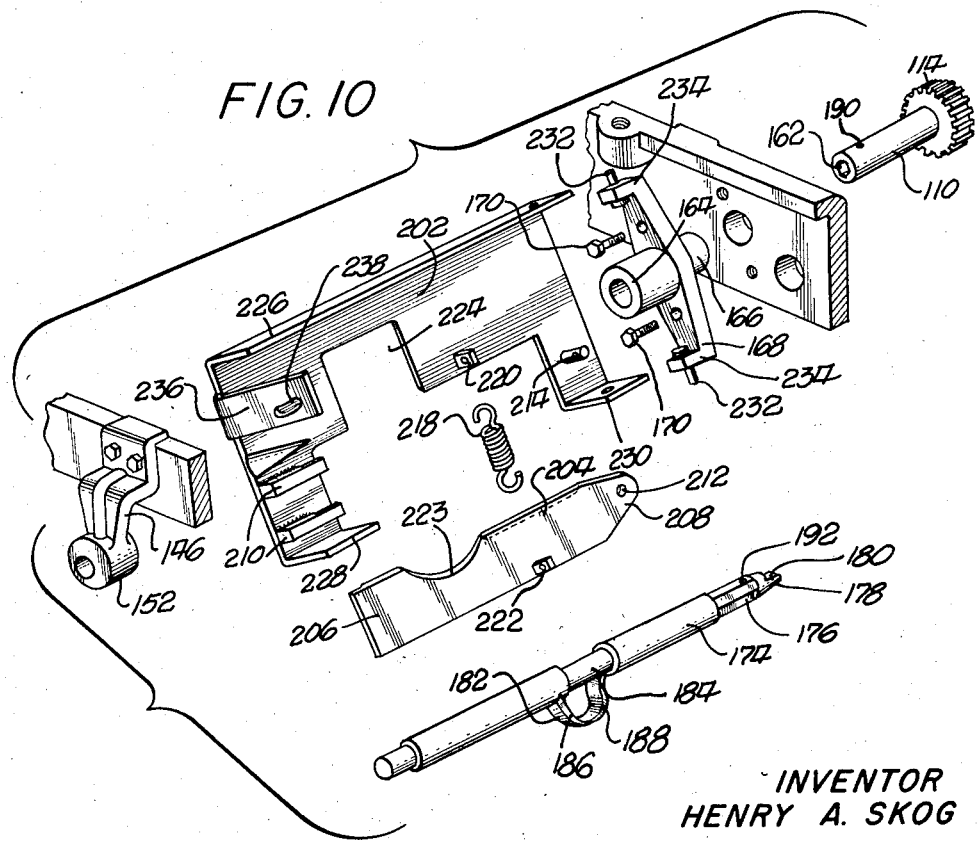
INVENTOR
HENRY A. SKOG
BY Moore, Prangley + Clayton
ATTORNEYS Nov. 11, 1958 H. A. SKOG 2,859,783
FRUIT PITTER HAVING SPIRAL KNIFE AND PIT RETAINING MEMBER
Filed Dec. 22, 1954 9 Sheets-Sheet 9

INVENTOR
HENRY A. SKOG
BY Moore, Prangley + Clayton
ATTORNEYS

# United States Patent Office 2,859,783
Patented Nov. 11, 1958

2,859,783

FRUIT PITTER HAVING SPIRAL KNIFE AND PIT RETAINING MEMBER

Henry A. Skog, Olympia, Wash., assignor, by mesne assignments, to Canning Equipment Co., Olympia, Wash., a corporation of Washington Application December 22, 1954, Serial No. 477,072

11 Claims. (Cl. 146—28)

This invention relates to a fruit pitter, and more particularly to a mechanism for pitting simultaneously two half peaches after they have been split and as the peach halves are being conveyed at a continuous, uniform rate.

The present invention consists of a new and improved pitter for use in a fruit splitting, spreading and pitting apparatus or machine such as disclosed in my prior patent No. 2,673,583, issued March 30, 1954.

Among the objects of the present invention is to provide a fruit pitter of greater simplicity; to provide a new and improved pitter capable of use in the machine shown in said Skog Patent No. 2,673,583; to provide in a machine of the character disclosed in said Patent 2,673,583 a fruit pitter capable of simultaneously pitting the two peach halves as they are moved at a continuous rate by the conveyor in said prior patent while possessing numerous improvements producing a better and more uniform quality of pitted fruit halves; to provide in a pitter of the type set forth above spiral pitting knives producing uniformly shaped cavities in the peach halves to provide a high grade of quality fruit halves; to provide in such a pitter fruit contacting or pressing plates having means or sections contacting the cutting edge of the pitting knives as they emerge from the pit cavities to prevent tearing of the fruit flesh by the knives as they emerge from such cavities and more particularly, a shear edge for and in continuous contact with the outer beveled edge of a spiral pitting knife as it emerges from the fruit half in completing the formation of the pit cavity; to provide in such a pitter cooperating pitter knives and fruit pressing plates relatively adjustable automatically from an initial position to pit the largest fruit or fruit halves to a position to pit the smallest fruit or fruit halves so that the depth of the pit cavity formed in each fruit half automatically varies with the size of the fruit half; to provide in such a pitter simple means effective to adjust each presser plate relative to the axis of rotation of its associated pitting knife and simultaneously apply to the presser plate an increased resilient pressure maintaining it in firm engagement with the exposed surface of the fruit half during the movement of the pitting knife about the pit; to provide a pitter having pitting knives and presser plate assemblies for simultaneously pitting two half peaches and common actuating means for adjusting the presser plate assemblies relative to the associated pitting knives in accordance with the size of the fruit halves while permitting the presser plate assemblies to be adjusted different amounts relative to the pitting knives if the fruit sections to be pitted are not exactly the same size; to provide new and improved drive means or mechanism for the spiral pitting knives in such a pitter so that the positioning and timing of the operation of the knives with relation to the movement of a traveling pitter head may be improved.

Other and further objects and advantages of the invention will be apparent from the following description when taken in connection with the accompanying drawings wherein:

Fig. 9 is a fragmentary plan view partly in section taken along the line 9—9 of Fig. 7;

Fig. 10 is an exploded fragmentary view illustrating the formation and mounting of a pressing plate assembly and an associated pitting knife in a pitter embodying the present invention;

The present invention is best exemplified by reference to its association with a machine such as that disclosed in Skog Patent No. 2,673,583, which machine is adapted to receive successively whole fruits, particularly clingstone peaches, and continuously pass each of the succession of whole fruits through the machine in the course of which continuous passage each whole fruit is split and divided, the divided halves separated and brought simultaneously under a traveling pitter or de-seeder which extracts the pit from the fruit without interrupting its passage through the machine, and the pitted or de-seeded halves are then discharged from the machine as each fruit holder begins its reverse travel to receive the next whole fruit.

Figure 1:
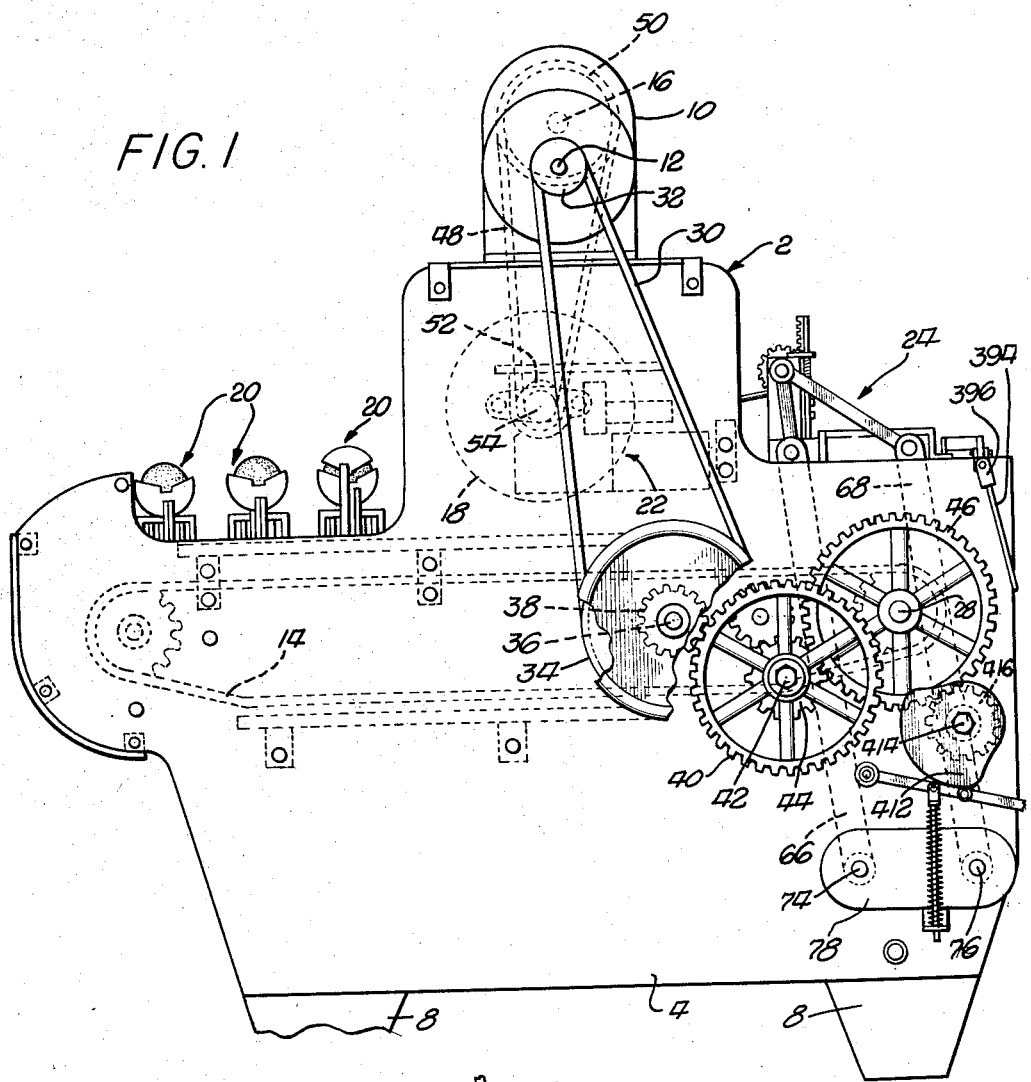
Fig. 1 is a view in side elevation of the machine embodying the present invention.

A preferred embodiment of that machine incorporating the present invention comprises, as disclosed in the drawings, a machine frame 2 (Figs. 1 and 3) having side plates 4 and 6 and four feet 8 at the ends of the side plates which are held in spaced relation by cross rods and plates as described in the Skog patent above mentioned, a combined motor and speed reducer 10 mounted upon a top cross plate, a slow speed shaft 12 driving a fruit feeding mechanism or conveyor 14, and a high speed shaft 16 which drives a fruit splitting or sawing mechanism 18. The fruit feeding mechanism, device or conveyor 14 is provided with a series of equally spaced fruit holders 20 which in succession receive whole fruit at the left in-feed end of the machine, as shown in Fig. 1, and carry each fruit to and past the splitting or sawing mechanism 18, to and past a separating or spreading mechanism 22, and to and past a pitting or de-seeding mechanism 24 and discharges the fruit at the right end, or discharge end, of the machine as each fruit holder passes about the rear sprocket of the chains of the conveyor 14.

Figure 3:
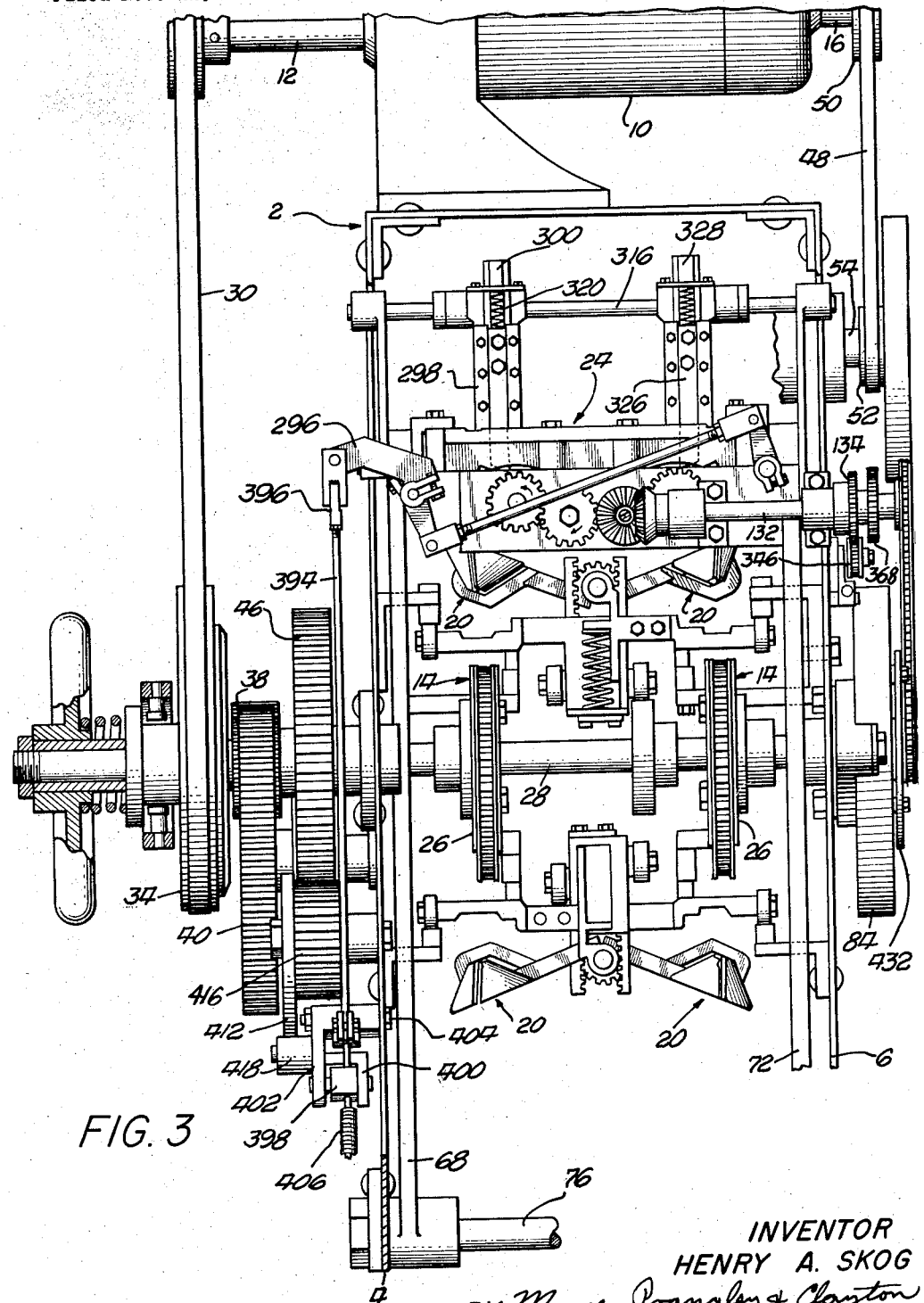
Fig. 3 is an enlarged fragmentary view in end elevation and partly in section of the machine shown in Fig. 1.

The fruit holders 20, each of which comprises a set of four quadrant cups or sections may be constructed as shown in said Skog prior Patent 2,673,583 and are secured to the chain of the conveyor 14 as described in said application and in said patent so that two quadrants of each holder are positioned to form an open top receptacle to receive a whole peach inserted therein by hand, with the suture plane of the peach aligned as near as may be with the plane of the splitting saw 18, after which the other two cup quadrants of each fruit holder are moved over the first mentioned two cup quadrants to form a closed receptacle grasping and further centralizing the fruit with respect to the splitting saw. The upper and lower quadrants of the cup holder are spaced apart so as to pass on opposite sides of the saw as the chains of the conveyor 14 carry each fruit holder past the saw and on to the spreading mechanism 22 which is constructed and arranged as described in said Skog patent to cause the fruit halves to diverge and be spread apart and remain in the cup halves formed by the cup quadrants on each side of the plane of the saw as the opposite pair of cup quadrants are swung outwardly as described in said Skog patent. After the opposite pairs of cup quadrants have been swung to an open position, as illustrated in Fig. 3, in which each of said fruit halves faces upwardly with its cut surface lying in an inclined plane, the fruit halves are simultaneously presented to the pitter mechanism 24 which reciprocates from a rearmost position as illustrated in Fig. 1, along an upwardly extending arcuate path in the same direction as the fruit holders and the fruit holders are swung upwardly by spring action, to bring the fruit into engagement with the under side of the pitting mechanism which by the time such engagement is effected is traveling at the same rate of speed as the fruit holders.

The present invention is concerned with the pitter mechanism 24 and with changes in the driving mechanism of the machine of the prior Skog patent to operate that pitter mechanism and the parts thereof in proper timed relation with the other parts of the complete machine.

The chains of the conveyor 14 are driven through sprockets 26 (see Fig. 3) secured to a main drive shaft 28 mounted in suitable bearings carried by the side plates 4 and 6. The shaft 28 is driven by the motor speed reducer 10 through a belt 30 (Figs. 1 and 3) passing over a pulley 32 secured to the slow speed shaft 12 and a pulley 34 secured to a stud shaft 36 mounted in a suitable bearing bracket secured to side plate 4. A gear 38 on the shaft 36 meshes with a larger gear 40 on a cross shaft 42 mounted in suitable bearing brackets secured to side plates 4 and 6, and a gear 44 on the shaft 42 meshes with a larger gear 46 on the main drive shaft 28. The splitting saw is continuously rotated at high speed by the motor speed reducer 10 through a belt 48 passing about a pulley 50 on the high speed shaft 16 and a pulley 52 on the shaft 54 which carries the splitting saw 18.

Figure 8:
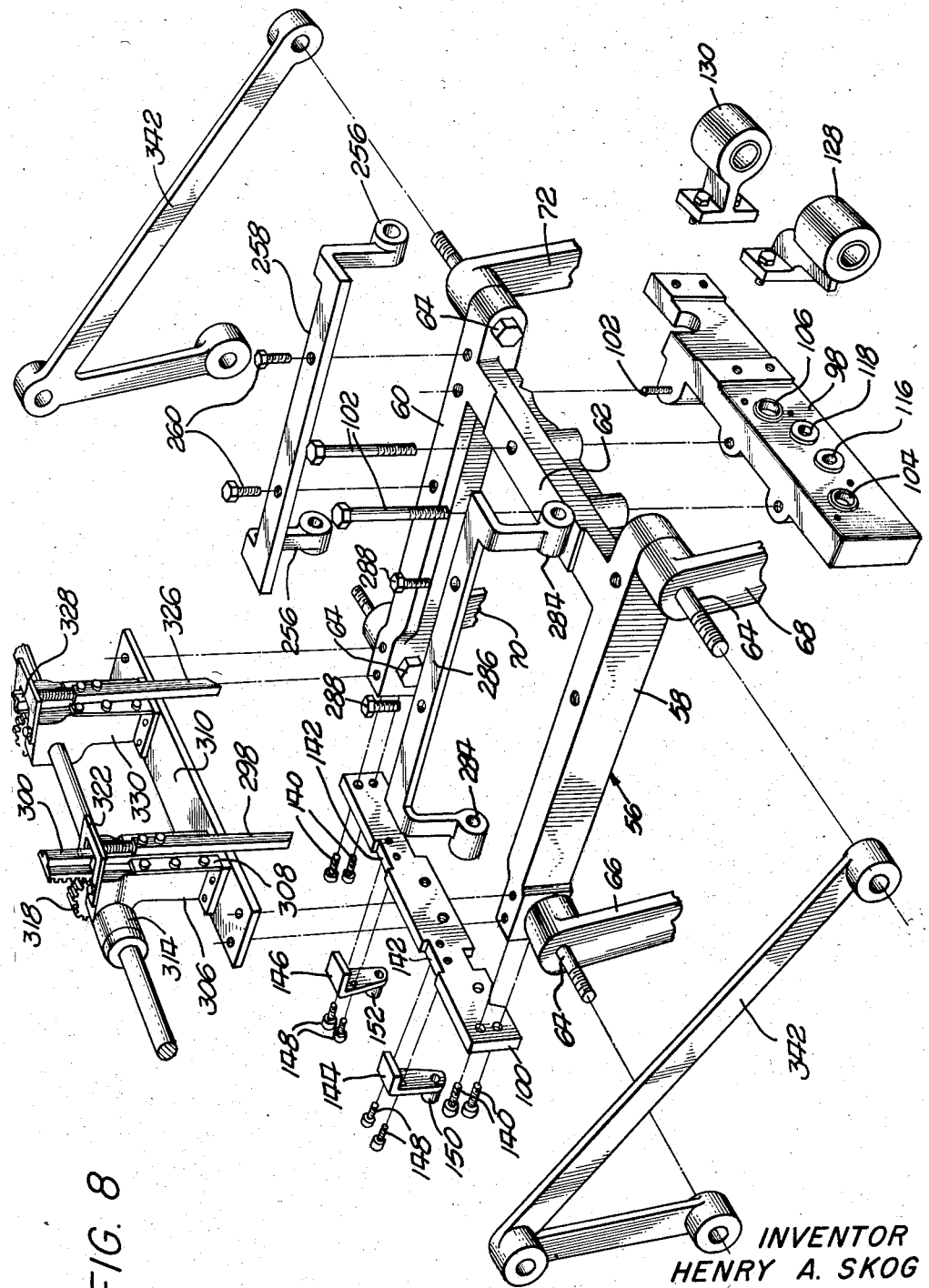
Fig. 8 is an exploded fragmentary view in perspective showing the pitter head frame and certain supporting brackets and operating mechanisms carried thereby.
Figure 12:
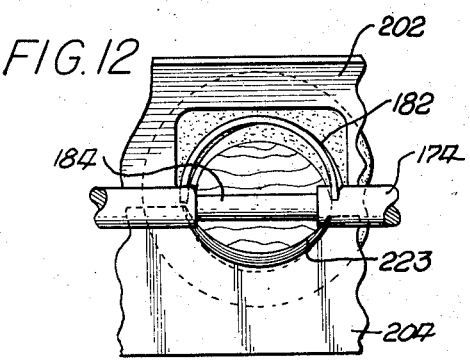
Fig. 12 is a view of the parts illustrated in Fig. 11 substantially as seen in the direction of the arrows along the line 12—12 thereof.

The pitting or deseeding mechanism 24 comprises a traveling frame 56, as best shown in Fig. 8. As there shown, the frame comprises longitudinal bar portions or arms 58 and 60 joined adjacent their forward ends by an integral cross bar 62. The frame 56 is pivotally mounted by stud bolts 64 on the upper ends of parallel links 66, 68, 70 and 72. Parallel links 66 to 72 are journaled on parallel cross shafts 74 and 76, Figs. 1 to 4, mounted in bosses of brackets such as 78 bolted to side frame plates 4 and 6. The pitter head frame 56 is moved rearwardly of the machine but "forwardly" with the moving fruit cups 20 from the "rearward" position of Fig. 1 to the "forward" position of Fig. 4 by a rod, bar or plate 80 pivotally connected at its rear end, as by stud bolt 82, to the mounting link 72 for the pitter head frame. The bar 80 is driven by a cam 84 secured to the end of the shaft 42, the bar 80 being provided with a cam roller 86 which is received in an internal cam track 88 of the cam 84. The bar 80 is also provided with a slot 90 through which the shaft 42 extends so that the shaft serves as a guide for the bar 80.

Figure 5:
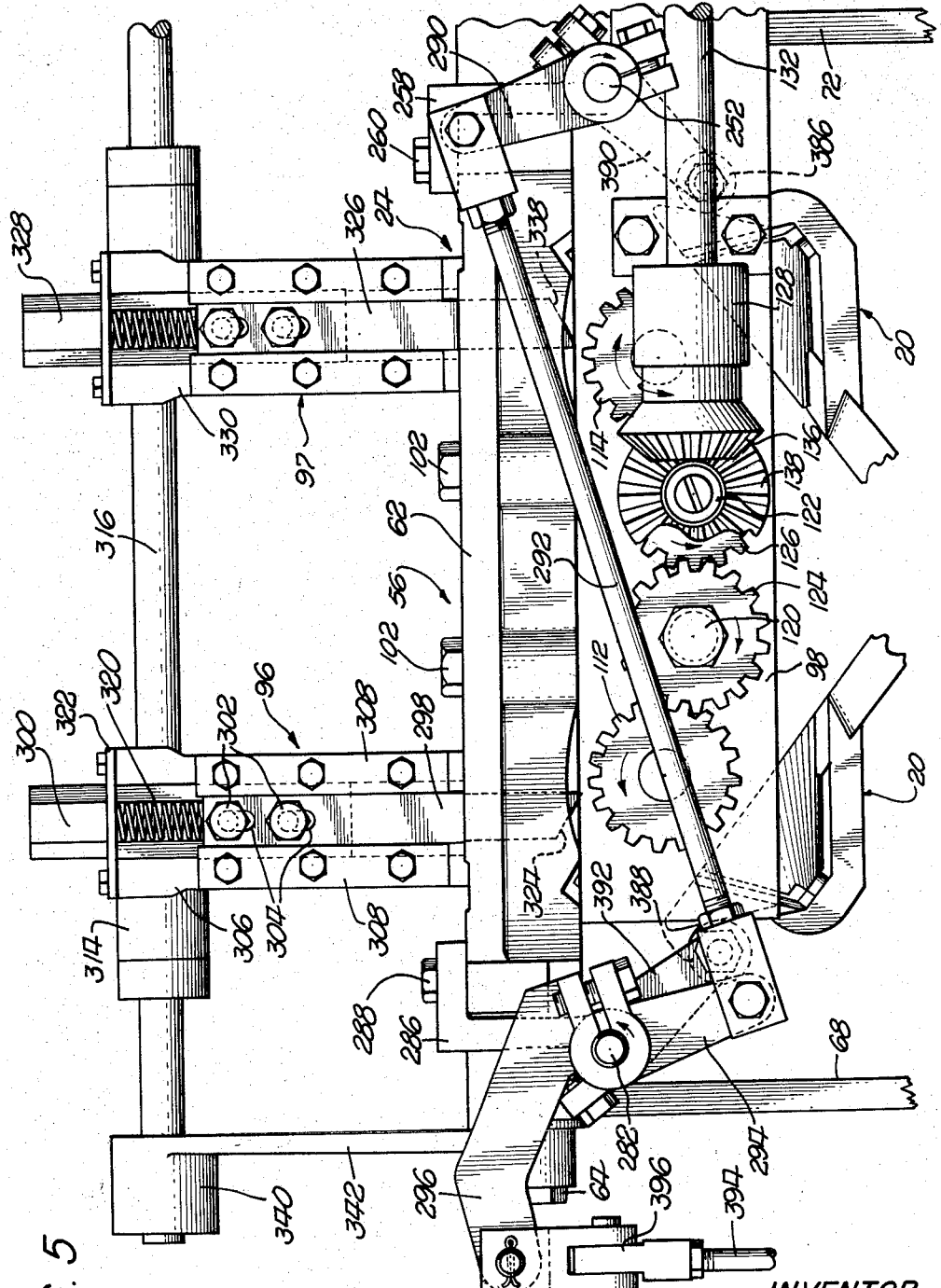
Fig. 5 is an enlarged fragmentary view in vertical elevation and taken generally along the line 5—5 of Fig. 4.
Figure 6:
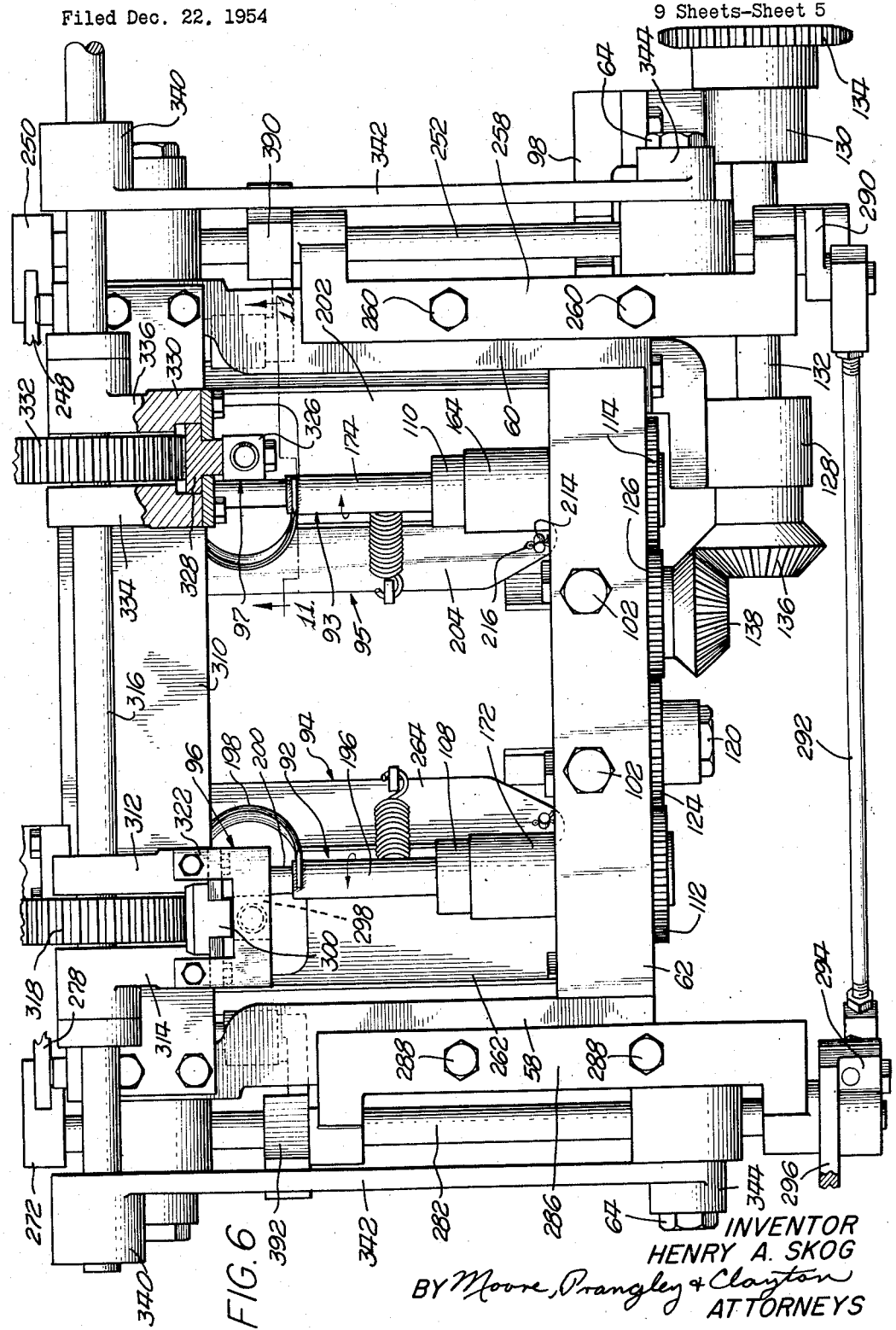
Fig. 6 is an enlarged fragmentary plan view taken along the line 6—6 of Fig. 4.

The pitter head frame 56 carries a pair of pitter knife mechanisms or assemblies 92 and 93 (Fig. 6), a pair of pressure plate and shear plate assemblies 94 and 95 and a pair of pit retaining assemblies 96 and 97. The pitting knife assemblies 92 and 93 comprise a rear mounting bracket 98 and a forward mounting bracket 100, the rear mounting bracket 98 being secured to the underside of the cross bar 62 of the pitting frame as by bolts 102 and formed with apertures 104 and 106 to receive the stems 108 and 110 of pitting knife drive gears 112 and 114. Two apertures 116 and 118 are provided in the bracket 98 to receive studs 120 and 122 (Fig. 5) on which idler gears 124 and 126 are rotatably mounted, these gears intermeshing with each other and with the drive gears 112 and 114. Bearing brackets 128 and 130 (Figs. 5, 6 and 8) are bolted to the face of the bracket 98 and rotatably support a drive shaft 132 having at its outer end a drive sprocket 134 and at its inner end a bevel gear 136 which meshes with a bevel gear 138 fastened to the idler gear 126.

The forward bracket 100 (Figs. 7 and 8) is fastened to the forward ends of the arms 58 and 60 of the pitting frame as by bolts 140. Along its upper edge the bracket 100 is provided with notches 142 to receive the shelf portions of shaft mounting bearing brackets 144 and 146 secured to the bracket 100 as by bolts 148, the brackets 144 and 146 having apertured bearing bosses 150 and 152 at their lower ends.

Pitter knife drive gear 114 and its stem 110 are preferably formed as one piece, the stem 114 having at its rear end a circular aperture 154, Fig. 9, in which is press-fitted a pin 156 having at its inner end a tongue 158 formed with a flat under surface 160. The stem 110 of the drive gear 114 is formed at its forward end with a smaller hexagonal bore 162 (Fig. 10). The pin 156 is so oriented in the bore 154 that the flat surface 160 is parallel to one of the flat sides of the walls of the hexagonal bore 162. The stem 110 of the drive gear is journaled in bearing bosses 164 and 166 formed integrally with or secured to a pressure plate mounting bracket 168 secured to the forward face of the rear bracket 98 as by bolts 170, the boss 166 being received in the aperture 106 of the bracket 98.

The drive gear 112 and its stem 108 are formed in the same manner as the drive gear 114 and its stem 110 and stem 108 is similarly mounted in a bearing bracket 172 (Fig. 6) identical to the bearing bracket 168 and having its rear boss, corresponding to the boss 166, received in the aperture 104 in the bracket 98.

Figure 11:
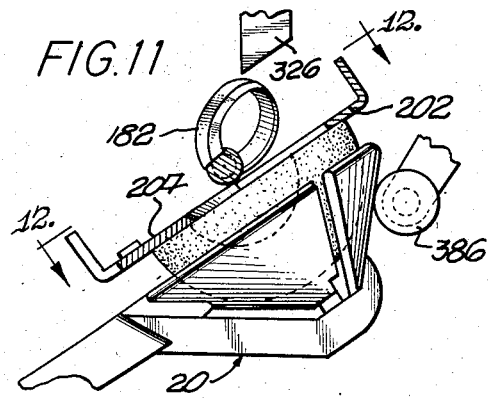
Fig. 11 is a fragmentary view illustrating the operation of the pitting knife and the pit holder or plunger, the knife and plunger being shown in the position assumed just prior to entry of the knife into the fruit flesh and before engagement of the plunger with the fruit pit.
Figure 14:
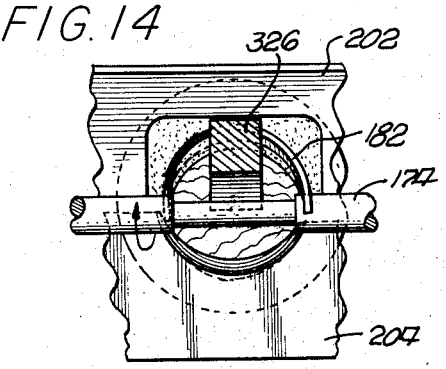
Fig. 14 is a view in section of the parts in Fig. 13 substantially as seen in the direction of the arrows along the line 14—14 thereof.
Figure 13:
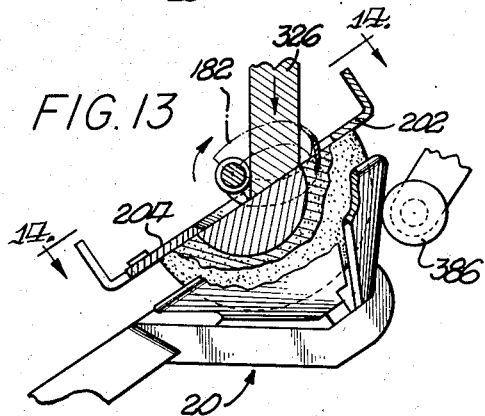
Fig. 13 is an operational view similar to Fig. 11 showing the knife shortly after entry into the fruit flesh and showing the plunger in contact with the fruit pit.
Figure 15:
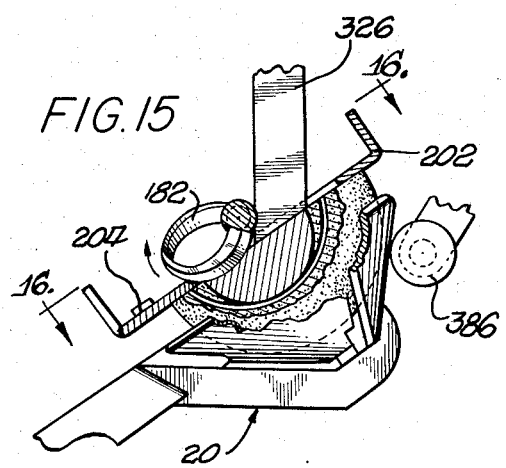
Fig. 15 is an operational view similar to Figs. 11 and 13 and showing the parts in position immediately after exit of the pitting knife from the fruit flesh and showing the plunger still in contact with the fruit pit.

A pitter knife shaft 174 (Figs. 6, 7, and 11 to 16) is journaled in the boss 152 of the forward bearing bracket 146 and is formed at its rear end with hexagonal end portion 176 for mating engagement with hexagonal bore 162 of the stem 110 of the drive gear 114 and the knife shaft is also provided with a rear tapered end 178 notched to provide a flat tongue 180 for mating engagement with the tongue 158 of the pin 156. The knife shaft 174 is provided with spaced notches to receive the flat ends of a spiral or helicoidal knife blade 182. Knife blade receiving slots in the shaft 174 are displaced peripherally of the shaft approximately 90 degrees and the inserted ends of the helicoidal blade are brazed to the knife shaft. In sections transverse to the axis of the knife shaft, knife blade 182 is concentric to the axis of the shaft as illustrated in Figs. 11, 13 and 15, while in a direction longitudinally of the knife shaft, the knife blade is concentric to a point on the periphery of the shaft, as illustrated in Fig. 9. The shaft is formed between the ends of the knife with a reduced portion 184 for purposes which will presently appear. The external surface of the knife blade at its forward edge is formed with a relatively deep or wide knife edge forming bevel 186 and the inner surface of the knife blade at the same forward edge is formed with a very short bevel 188 for guiding the knife about the pit and minimizing chattering of the knife. It should be noted that the flat surface of the positioning tongue 180 at the rear end of the knife is parallel to one of the sides of the hexagonal portion 176 of the knife shaft. The tongue 158 of the pin 156 and the tongue 180 at the rear end of the knife shaft cooperate for timing purposes to insure a precise angular positioning of the knife blade in respect to the drive gear 114. It may be noted that the stem 110 of the drive gear is provided with a cross aperture 190 and the hexagonal portion 176 of the knife shaft is formed with a like cross aperture 192, these apertures being aligned when the knife shaft is properly positioned in the stem 110 for greasing purposes.

The knife shaft 196 of the pitter knife assembly 92 is identical to the pitter knife shaft 174 and has mounted on it in the same manner a spiral or helicoidal pitter knife blade 198. The shaft 196 is secured in the stem 108 of the drive gear 112 in the same manner as the shaft 174 is secured to the stem 110 of the drive gear 114. The pitter knife shaft 198 is also formed with a reduced portion 200 between the ends of the pitter knife blade 198.

The pressure and shear plate assembly 95 (Figs. 6, 7 and 9 to 16) comprises a pressure plate 202 and a shear plate 204, the pressure plate being formed with a longitudinally extending opening or recess to receive the main body of the shear plate 204. The shear plate 204 is substantially twice the thickness of the pressure plate 202 and is formed with opposite reduced end portions 206 and 208 to overlie the inner face of the pressure plate while the outer face of the shear plate is coplanar with the outer face of the pressure plate. The end 206 of the shear plate is received between the inner face of the pressure plate and the opposed faces of notches in the ends of guide lugs 210 soldered or welded to the pressure plate. The opposite thin end 208 of the shear plate is formed with a pivot opening 212 for receiving a pivot pin 214 welded to the pressure plate, a cotter pin 216 in the pivot pin holding the shear plate in assembled relation with the pressure plate. The shear plate is yieldably mounted on the pressure plate and resiliently urged to inward position by a coil spring 218 secured at one end to a lug 220 welded to the inner face of the pressure plate and a lug 222 welded to the inner face of the shear plate. A pit exposing recess 224 in the pressure plate communicates with the shear plate receiving opening in the pressure plate, the pressure plate being mounted as hereinafter described in such relation to the knife shaft 174 and the pitter knife blade 182 that the pitting blade passes through the recess 224 in the pressure plate as it moves toward and enters the fruit half to effect pitting thereof.

Figure 7:
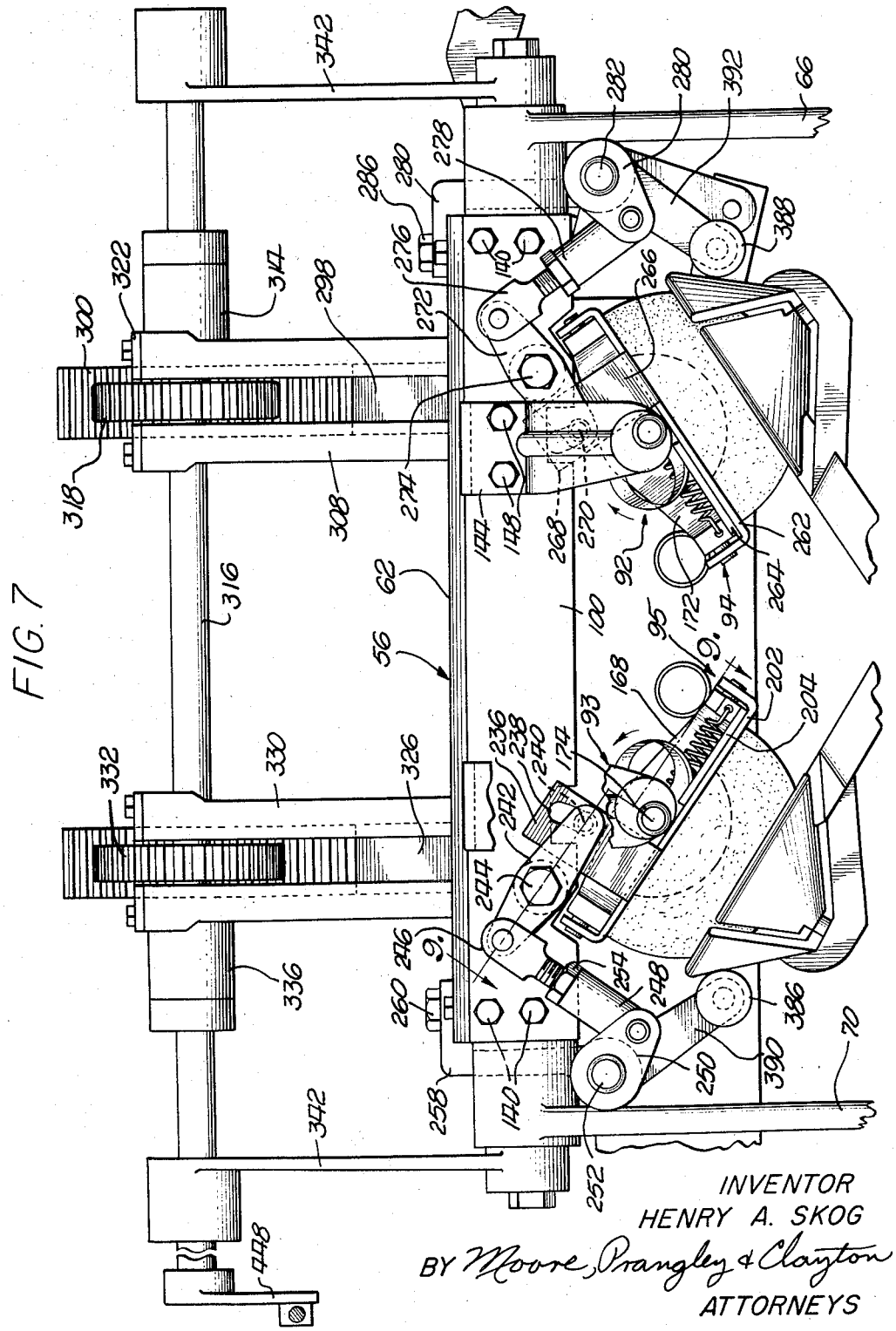
Fig. 7 is an enlarged fragmentary view in elevation and partly in section taken along the line 7—7 of Fig. 4.

The pressure plate 202 is formed with a horizontal transverse flange 226 along its upper edge and parallel transverse flanges 228 and 230 at its lower edge. The pressure plate is pivotally mounted by friction-pivot roll pins 232 received in aligned openings in the inturned ends 234 of the bearing bracket 168 and in aligned openings in the flanges 226 and 230. The presser plate is formed at its forward end with an integral upstanding lug or projection 236 having an arcuate slot 238 for receiving an adjusting and control pin 240 (Figs. 7 and 9). The pin 240 is secured to one end of a crank or lever 242 journaled on a pivot stud 244 received in the threaded aperture in the forward bracket 100. The crank 242 is connected by an adjustable linkage consisting of a threaded link 246 pivoted to the outer end of the crank 242 and threaded into a sleeve 248 pivoted to a crank 250 secured to the forward end of a shaft 252, the adjusted linkage being held in adjusted position as by a lock nut 254. The shaft 252 extends alongside the pitter frame 56 parallel to the arm 60 and is journaled in the depending bosses 256 (Fig. 8) of a mounting bracket 258 supported on the arm 60 of the pitting frame and secured thereto as by bolts 260.

Pressure plate and shear plate assembly 94 (Figs. 6 and 7) includes a pressure plate 262 and a shear plate 264 of the same structure as the pressure plate 202 and shear plate 204 but complemental thereto, i. e., right and left handed. The pressure plate 262 is pivotally mounted on the bracket 172 in the same manner as the pressure plate 202 is mounted on the bracket 168 and the shear plate 264 is mounted on the pressure plate 262 in the same manner as the shear plate 204 is mounted on the pressure plate 202. The pressure plate 262 is provided at its forward end with an upstanding lug or projection 266 (Fig. 7) corresponding to the lug 236 and formed with an arcuate recess 268 receiving an adjusting and control pin 270 carried by a crank or lever 272 journaled on a stud 274 threaded into the bracket 100, the crank 272 being connected by an adjusting linkage consisting of rod 276 and sleeve 278 corresponding to the rod and sleeve 246—248 to a crank 280 secured to the forward end of a shaft 282 extending parallel to the arm 58 of the pitting frame 56 in depending bosses 284 (Fig. 8) of a bracket 286 supported on the arm 58 and secured thereto as by bolts 288. The shafts 252 and 282 are interconnected at their rear end by a crank 290 (Figs. 5 and 6) secured to the shaft 252 and an adjustable pitman 292 pivoted to the crank 290 and to a crank 294 secured to the rear end of shaft 282. A common actuating crank 296 which may be formed integrally with the crank 294 simultaneously actuates both shafts 252 and 282 in opposite directions simultaneously to raise and lower the pressure plate and shear plate assemblies 94 and 95.

The pit retaining assembly 96 comprises a pit retaining square bar 298 (Figs. 5 to 8) adjustably secured to a T-shaped rack bar 300 by attaching bolts 302 threaded into the rack bar and passing through adjusting slots 304 in the pit retaining bar 298. The rack bar 300 is guided in an upstanding guide block 306 and by guide plates 308 bolted in spaced relation to the guide block 306. The guide block 306 is bolted at its lower end to a plate or bar 310 bolted at its opposite ends to the top surfaces of the forward ends of the arms 58 and 60 of the pitting frame 56. The guide block 306 is formed at its upper end with spaced forwardly projecting bosses 312 and 314 in which is journaled an actuating shaft 316 to which is secured, between the bosses 312 and 314, a gear sector 318 meshing with the rack bar 300.

A coil spring 320 is mounted between the upper end of the pit retaining bar 298 and a retaining plate 322 bolted to the upper end of the guide block 306.

The lower end or face 324 of the pit retaining bar 298 is beveled or inclined at the same angle as the pressure plate 262.

The pit retaining assembly 97 which is of the same structure as the pit retaining assembly 96 comprises a square pit retaining bar 326 adjustably secured to rack bar 328 guided in block 330 also bolted to the mounting plate or bar 310 and driven by a sector gear 332 also secured to the shaft 316 and located between the spaced shaft bearing bosses 334 and 336 of the guide block 330. The pit retaining bar 326 is formed with a lower end surface 338 inclined oppositely to the lower face 324 of the pit retaining bar 296 and parallel to the inclined pressure plate 202. The shaft 316 is also supported and mounted at its opposite end portions in bosses 340 of angular mounting yokes 342 having diverging arms with integral bosses 344 formed at the lower ends secured to the stud mounting bolts 64 by which the parallel links 66 to 72 are secured to the pitter frame 56.

Figure 4:
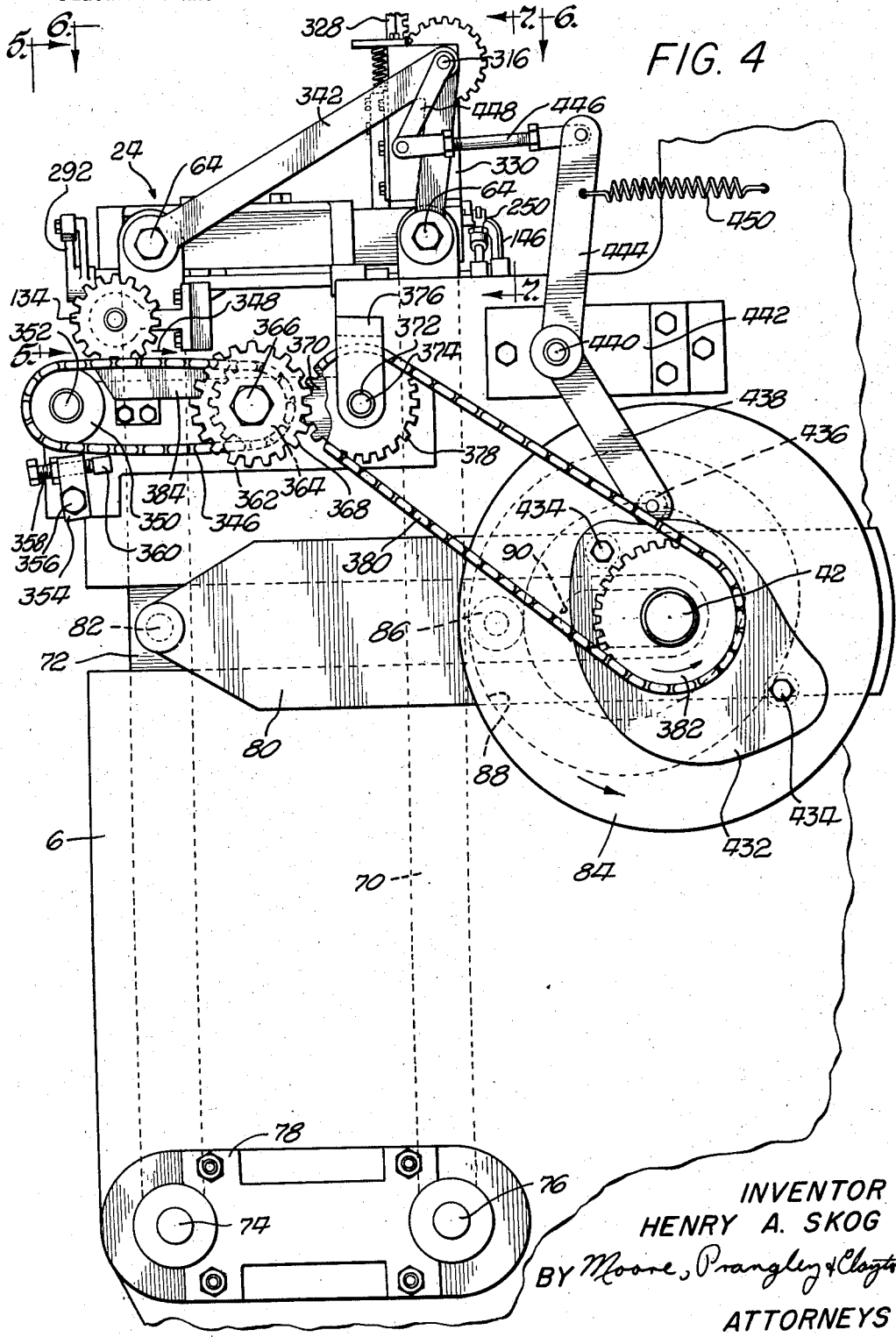
Fig. 4 is an enlarged, fragmentary view in side elevation of the opposite side of the machine from that shown in Fig. 1.

The pitter knife shafts 174 and 196 are simultaneously rotated in opposite directions by the drive sprocket 134, which is driven by a continuously moving chain 346, Fig. 4, driven at a continuous uniform rate in the direction of the arrow 348. The chain 346 at its rear end passes about an idler wheel or disk 350 mounted on a stud shaft 352 carried by a bracket or yoke 354 pivoted at its lower end on a stud bolt 356 and held in adjusted position by an adjusting screw 358 inserted in the bracket 354 and bearing against a stop lug 360 secured to a mounting plate 362 secured in any convenient manner to the side plate 6 of the machine frame. The chain 346 is driven by a sprocket 364 journaled on a stud bolt 366 threaded into plate 362, the sprocket 364 being secured to a gear 368 also journaled on the stud bolt 366. The gear 368 meshes with a drive gear 370 secured to a sleeve 372 journaled on a shaft 374 supported by a bracket 376 on plate 362. A sprocket 378 on the outer end of the sleeve 372 is driven by a chain 380 from the drive sprocket 382 secured to the shaft 42. The supporting shafts 74 and 76 of the pivotal links 66 to 72 are so positioned relatively that as the pitter 24 moves "forwardly" from the position shown in Fig. 1 to the position shown in Fig. 4, it moves along a slightly rising arc or path of movement and the sprocket 134 therefore moves along a parallel slightly rising arc. In order to maintain the chain 348 in mesh with the sprocket 134, the upper flight of the chain is guided along the upper edge surface of a guide plate 384 bolted to the plate 362, the guide surface of the plate 384 being concentric to the slightly rising arc of the path of movement of the sprocket 134. The chain 346 is driven in the direction of the arrow 348 at substantially the same rate of movement as the pitter head so that as the pitter head moves "forwardly" from the position of Fig. 1 to the position of Fig. 4, the sprocket 134 is driven in a counterclockwise direction, but on "backward" movement of the pitter head from the position of Fig. 4 to the position of Fig. 1, the sprocket 134 is held against rotation. Hence the pitter knives are operated through 360 degrees during the "forward" movement of the pitter head, but remain stationary, i. e., non-rotative, during the "backward" movement of the pitter head.

As the pitter head moves "forwardly" and the opposed pairs of fruit cup quadrants are swung upwardly, as described in Skog Patent 2,673,583, to position the fruit halves in pitting position with respect to the pitter, the pressure plate and shear plate assemblies are automatically adjusted with respect to the axis of the pitter knife shafts 174 and 196 in accordance with the sizes of the individual fruit halves so that the pitting knives will take properly dimensioned deep cuts in large fruit halves and properly proportioned shallow cuts in small peach halves, as the knives move about the half pits in such fruit halves. It should be noted that the pressure plate and shear plate assemblies 94 and 95 are normally positioned at points of closest proximity to the axis of the knife shafts and are relatively adjusted away from the axes of those knife shafts to make shallower cuts in smaller peach halves. These automatic adjustments of the pressure plate and shear plate assemblies are accomplished by the adjusting and control pins 240 and 270, for as these pins move downwardly these assemblies drop down under the action of gravity until they contact the surfaces of the fruit halves. The common actuating crank 296 simultaneously effects the downward movement of these adjusting and control pins 240 and 270, it being noted that arcuate slots in which these control pins are received permit different amounts of downward movement of the pressure plate and shear plate assemblies. The amount of movement of the adjusting and control pins 240 and 270 is automatically regulated by the size of the individual peach halves by means of control rollers 386 and 388, Figs. 5 and 7, journaled on suitable stud bolts carried at the outer ends of levers 390 and 394 secured to the shafts 252 and 282, respectively, in line with the pit exposing recesses in the pressure plate and shear plate assemblies, the rollers 386 and 388 being thus positioned to engage the outer walls of the opposed pairs of cup quadrants carrying the fruit halves, as shown in Fig. 7, and prevent further downward movement of the adjusting and control pins 240 and 270. It should be noted that as these control pins move downwardly, their respective pressure plate and shear plate assemblies move down by gravity until they contact the upwardly swinging fruit halves, after which the pressure plate and shear plate assemblies cease moving downwardly or, depending on the size of the fruit, move upwardly as the adjusting and control pins continue to move downwardly until the position-determining rollers 386 and 388 engage the outer walls of the cups carrying the fruit halves. At that time downward movement of the adjusting and control pins is terminated because they could move further downwardly only in the event that the rollers 386 and 388 could move further upward. Thus it will be evident that the adjusting and control pins 240 and 270 and position-determining rollers 386 and 388 and interconnecting mechanisms form means for measuring the sizes of the fruit halves and automatically determine the depth of pitting cuts to be taken in the fruit halves in accordance with the sizes thereof. Applicant has found that the size of a fruit half is in general a substantially accurate indication of the size of the pit, and furthermore that by varying the depth of the pitting cut in accordance with the size of the fruit half, the highest quality of pitted fruit halves is provided. It will be evident that small fruit halves in which a large pit cavity has been formed are classified as of lower quality and grade than such size of fruit halves having a properly proportioned shallow pit cavity therein. It will also be evident that with larger fruit halves a sufficiently deep cut must be made to encompass or effect severance of the large half pits, and that if it is attempted to pit a large fruit half with the knife sized or adjusted to cut a shallow cut, the pits will be split or the knives will be broken and portions of the pit will be embedded in the flesh of the fruit, thereby producing considerable wastage.

Figure 2:
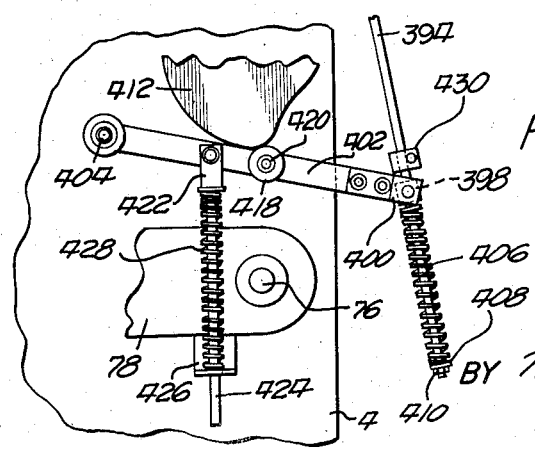
Fig. 2 is an enlarged fragmentary view in side elevation showing the cam control adjusting means and pressure means forming a part of the present invention.
Figure 16:
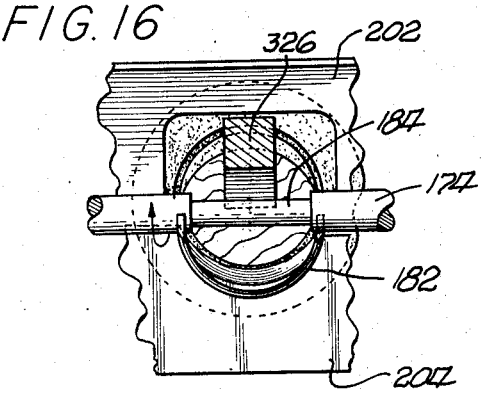
Fig. 16 is a view in section of the parts as illustrated in Fig. 15 substantially as seen in the direction of the arrows along the line 16—16 thereof.

Such fruit size measuring means and pit cavity depth control means are actuated in timed relation with the fruit carrying cups and the pitter 24 by common drive mechanism which includes the common actuating crank 296 (Figs. 3 and 5), an actuating rod 394 connected by universal joint 396 to the outer end of the common actuating crank 296, the rod 394 having slidably mounted on it a slide block 398, Fig. 2, pivoted at its opposite sides in a yoke 400 secured to an actuating lever 402 journaled on a stud bolt 404 threaded into the machine side plate 4. A spring 406 encircling the lower end of the actuating rod 394 bears at its opposite end against the slide block 398 and its lower end against a retaining washer 408 held by a nut 410 threaded on the lower end of the rod. A cam 412 mounted on a stud shaft 414 threaded in the side plate 4 is secured to a gear 416 which meshes with the gear 46, and this cam engages a cam roller 418 mounted on a stud bolt 420 threaded into the actuating lever 402. A bracket 422 pivoted to the actuating rod 402 carries a rod 424 slidably mounted in a bracket 426 secured to the bracket 78. A coil spring 428 encircles the rod 424 between the brackets 426 and 422 and maintains the roller 418 in engagement with the surface of the cam 412 so that as the declining radius portion of the cam passes the roller 418, spring 428 swings the lever 402 upwardly. This upward movement of the lever 402 is further assisted by the spring 406. A limit collar 430 is secured to the actuating rod 394 above the slide block 398 so that when the lever 402 in rising brings the slide block into engagement with the stop rod 430, the rod 394 is thereafter moved upwardly to swing the position-determining rollers 386 and 388 away from the fruit carrying cups and move the adjusting and control pins 240 and 270 upwardly, to raise the shear plate and pressure plate assemblies 94 and 95, while the rollers 386 and 388 clear the path for the subsequent downward swinging movement of the fruit carrying cups as the pitter 24 approaches the end of its "forward" movement. As the larger radius portion of the cam 412 approaches the roller 418, the lever 402 is moved downwardly to move the slide block 398 downwardly of the actuating rod 394 thereby compressing the spring 406 which in turn moves the actuating rod 394 downwardly and swings the position-determining rollers 386 and 388 toward the rising fruit carrying cups, after the cups have been raised a sufficient amount, and at the same time swing the adjusting and control pins 240 and 270 downwardly thereby first permitting the pressure plate and shear plate assemblies 94 and 95 to move downwardly until they engage the upwardly facing but inclined cut surfaces of the fruit halves and then permit those assemblies to move upwardly while the control pins continue to move downwardly until the rollers 386 and 388 have been brought into engagement with the fruit cups thereby limiting the further downward movement of the adjusting and control pins. It should be noted that spring 406 acting upon the rod 304 applies through the position-determining rollers 386 and 388 and through the adjusting and control pins 240 and 270 an auxiliary compressive pressure upon the fruit halves so that the flesh of the fruit halves is firmly held and compressed as the pitting knives are swung about the pits so that the knives make a clean and smooth cut forming the pit cavities in the fruit halves. Each pitting knife first contacts the surface of the half peach, exposed by the recess in the pressure plate, at the leading end of the helical cutting edge of the knife, the initial point of contact being in line with the "forward" end of the pit, and as the knife rotates the helical cutting edge progressively forms the pitting cut about the pit from the "forward" end of the pit to the "rear" end of the pit while the fruit is of course traveling at a continuous uniform rate in the "forward" direction and the pitting knives are traveling in that "forward" direction at the same rate of speed as the fruit halves. The leading end of the helical cutting edge of each knife first leaves the fruit half and as it leaves the fruit half it contacts the shear edge 223 of the shear plate which lies over and contacts the exposed surface of the fruit half on the side of the pit opposite the fruit exposing recess 224. The shear plate is so positioned at its innermost limit of movement, to which it is constantly urged by the spring 218, and the bevel edge 223 is so proportioned in relation to the external bevel of the pitting knife, that the cutting edge of the knife does not contact the shear plate but the bevel surface of the knife behind the cutting edge contacts the shear edge 223 of the shear plate. The shear plate is thus pushed outwardly, against the force of the spring 218, by the pitting knife itself and the shear plate therefore is automatically maintained in shear contacting relation to the entire length of the cutting edge of the pitting knife as it emerges from the fruit half, so that the shear plate prevents tearing of the surface of the fruit as it emerges from the fruit half, all as illustrated in Figs. 15 and 16.

It will be evident from Fig. 1 that ejection of the half pits from the fruit halves as the pitting knives emerge from the fruit halves and swing to their original positions, may cause serious damage and fouling of the machine because such ejected pit halves would fall from the pitter head and collect in and damage the mechanisms below the pitter head. The pit retainer bars 298 and 326 prevent such ejection of the pits. These pit retainers operate in the manner as illustrated in Figs. 11 to 16, from which it will be seen that a pit retainer, as for example the pit retainer 326, is held in elevated position until the leading section of the pitting knife has swung out of the path of the pit retainer, after which the pit retainer bar is quickly dropped into engagement with the pit and held in that lowered pit engaging position until the pitting knife has completed the formation of the pit cavity about the pit and the leading end of the pitting knife approaches the pit retainer bar at which time the bar is quickly raised to clear the path of the knife, in which elevated position the pit retainer is held until the pitting knife and the next successive fruit half presented to the pitter are in the relative position illustrated in Figs. 13 and 14. Such operation of the pit retaining bars in timed relation to the pitting knives and to the "backward" and "forward" movement of the pitting head is accomplished by a drive mechanism for the shaft 316, which drive mechanism preferably comprises an external surface cam 432, Fig. 4, secured to the pitter head drive cam 84, as by bolts 434.

The cam 432 actuates a cam roller 436 mounted at the lower end of a lever 438 secured to a sleeve journaled on a shaft 440 mounted on a bracket 442 secured to the machine side plate 6. A lever 444 is welded to the same sleeve as the lever 438 and at its upper end is pivoted to an adjustable link 446 in turn pivoted to the end of a crank 448 fixed to the end of shaft 316. A spring 450 secured at one end to the lever 444 and at the other end to a fixed pin carried by the machine side plate 4 serves to hold the cam roller 436 in engagement with the cam 432 and assists the pit retainer lowering spring 320 in effecting sudden downward movement of the pit retainer while the cam 432 very quickly swings the lever 436 upwardly to quickly raise the pit retainer bars as the leading ends of the cutting edges of the pitting knives approach the pit retaining bars.

It is apparent from the foregoing description that the applicant has provided a new and improved pitter capable of use in the machine shown in Skog Patent 2,673,583; in a machine of the character disclosed in Skog Patent 2,673,583 a fruit pitter capable of simultaneously pitting the two peach halves as they are moved at a continuous rate by the conveyor in said prior patent while possessing numerous improvements producing a better and more uniform quality of pitted fruit halves; spiral pitting knives producing uniformly shaped cavities in the peach halves to provide a high grade of quality fruit halves; contacting or pressing plates having means or sections contacting the cutting edge of the pitting knives as they emerge from the pit cavities to prevent tearing of the fruit flesh by the knives as they emerge from such cavities, and a shear edge for and in continuous contact with the outer beveled edge of a spiral pitting knife as it emerges from the fruit half in completing the formation of the pit cavity. Applicant has provided cooperating pitter knives and fruit pressing plates relatively adjustable automatically from an initial position to pit the largest fruit or fruit halves to a position to pit the smallest fruit or fruit halves so that the depth of the pit cavity formed in each fruit half automatically varies with the size of the fruit half. Applicant has provided a simple means effective to adjust each presser plate relative to the axis of rotation of its associated pitting knife and simultaneously apply to the presser plate an increased resilient pressure maintaining it in firm engagement with the exposed surface of the fruit half during the movement of the pitting knife about the pit. Applicant has provided a pitter having pitting knives and presser plate assemblies for simultaneously pitting two half peaches and common actuating means for adjusting the presser plate assemblies relative to the associated pitting knives in accordance with the size of the fruit halves while permitting the presser plate assemblies to be adjusted different amounts relative to the pitting knives if the fruit sections to be pitted are not exactly the same size, and a new and improved drive means or mechanism for the spiral pitting knives in such a pitter so that the positioning and timing of the operation of the knives with relation to the movement of a traveling pitter head may be improved.

It will be obvious that changes may be made in the form, construction and arrangement of the parts without departing from the spirit of the invention or sacrificing any of its advantages, and the right is hereby reserved to make all such changes as fairly fall within the scope of the following claims.

Having thus described the invention, what I claim as new and desire to secure by Letters Patent is:

1. In a fruit treating machine including a machine frame, means on the frame for feeding a pair of fruit halves with the cut faces exposed at a continuous uniform rate along a predetermined path, a traveling pitter mounted on the frame for movement to and fro parallel to said path, means for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members having an opening therein, a pair of pitter knives mounted for movement to and fro with said support and rotatably relative thereto through the holes in the plates for movement about the seed containing sections of the fruit halves to pit the same, a driven chain movable at a continuous uniform rate in one direction, a sprocket engaging said chain and rotatably mounted upon said traveling support and operatively connected to said pitter knives to rotate said knives about the seed containing sections of the fruit halves upon forward movement of the traveling pitter and holding the knives against rotation during the reverse movement of the traveling pitter.

2. In a fruit treating machine including a machine frame, a fruit conveyor on said frame, means for driving said conveyor continuously at a uniform rate, a fruit receptacle shiftably mounted on said conveyor for upward movement relative to the conveyor, a fruit pitter mounted on said frame above said conveyor for movement to and fro generally parallel to the path of movement of the conveyor and operatively connected with said driving means for movement at the same rate, said pitter including a traveling support, a pitting knife mounted on said support for rotary movement about an axis fixed with respect to said support, fruit engaging plate means shiftably mounted on said support for movement toward and from the axis of rotation of the knife, said fruit engaging plate means having an opening therein to expose the pit of a half fruit when brought into engagement with said plate means by upward movement of the receptacle to permit the knife to rotate from an initial position on one side of the plate means through the opening therein and about the pit of the half fruit in engagement with said plate means, means for moving said fruit receptacle upwardly relative to the conveyor to present the half fruit to the pitter and to bring it into engagement with said plate means, actuating means for shifting said fruit engaging plate means toward the axis of the knife as the fruit receptacle moves upwardly, and position control means associated with said actuating means for engaging said receptacle to limit the movement of the plate means toward the axis of the knife shaft in accordance with the size of the fruit half in said receptacle.

3. In a fruit pitter, means for supporting a fruit half with its cut face exposed, a rotary pitting knife having a helical cutting edge the opposite ends of which are angularly displaced about the axis of rotation of the knife whereby the helical cutting edge of the knife first engages the surface of the half fruit adjacent one end of the half pit and progressively severs the flesh of the half fruit about the pit from said end to the opposite end of the pit as the knife rotates through the half fruit, a pit retaining member mounted for movement transverse to the surface of the half fruit and to the axis of rotation of the pitting knife to engage the surface of the pit and prevent any portion of the pit from movement toward the axis of the knife as the knife rotates through the flesh of the half fruit and emerges therefrom, and means for rotating said knife and actuating said pit retaining member in timed relation with the rotation of the knife to engage the retaining member with the pit during the initial movement of the knife about the pit and hold it in engagement with the pit until the rear end of the knife emerges from the half fruit.

4. In a fruit treating machine including a machine frame, means on the frame for feeding a pair of fruit halves with their cut surfaces exposed and facing upwardly at a continuous uniform rate along a predetermined path, a traveling pitter mounted on the frame for movement to and fro above the fruit halves and parallel to said path, means operatively interconnecting said feeding means and said traveling pitter for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members including a pair of relatively shiftable plates having confronting edges forming apertures for exposing the pit of a fruit half engaged by the plate members with one of the plates extending into close proximity with the half pit and the aperture forming edge of said last mentioned plate conforming generally to the contour of the pit in the plane of the exposed surface of the half fruit, helicoidal pitting knives carried by said traveling support for rotation through said pit exposing apertures in said plates to sever the half pits from the fruit halves and positioned to engage in shearing relation to the pit contour conforming edges of the plates as the knives emerge from the fruits, a driving member mounted on the frame and moving at a continuous uniform rate in one direction, and a driven member carried by said traveling support and operatively connected to said pitting knives and in driving engagement with said driving member for rotating said helicoidal pitting knives in a direction to pit the fruit halves during movement of the pitter in the forward direction and for holding said pitting knives against rotation during the movement of the pitter in the rearward direction.

5. In a fruit treating machine including a machine frame, a conveyor on said frame, means for driving said conveyor continuously at a uniform rate, a pair of fruit receptacles shiftably mounted on said conveyor for upward movement relative to the conveyor, a fruit pitter mounted on said frame above said conveyor for movement to and fro generally parallel to the path of movement of said conveyor and operatively connected with said driving means for movement at the same rate, said pitter including a traveling support, a pair of pitting knives mounted on said support for rotary movement about an axis fixed with respect to said support, a pair of fruit engaging means shiftably mounted on said support for movement toward and away from the axis of rotation of said knives, each of said fruit engaging plate means having an opening therein to expose the pit of a half fruit when brought into engagement with said plate means by upward movement of the associated receptacle to permit the associated knife to rotate from an initial position on one side of said plate means through the opening therein and about the pit of the half fruit in engagement with said plate means, means for moving each of said fruit receptacles upwardly relative to the conveyor to present the associated half fruit to the pitter and to bring it into engagement with said plate means, actuating means for shifting said engaging plate means toward the axis of the associated knife as the associated fruit receptacle moves upwardly, the shifting of said plate means being independent of each other whereby to accommodate different sizes of half fruits in engagement therewith, and positioning control means associated with said actuating means for engaging said receptacles to limit the movement of said plate means toward the axis of the associated knife shaft in accordance with the size of the half fruit in said associated receptacle.

6. In a fruit pitter, means for supporting a fruit half with its cut face exposed, a rotary pitting knife having a helical cutting edge the opposite ends of which are angularly displaced about the axis of rotation of the knife whereby the helical cutting edge of the knife first engages the surface of the half fruit adjacent one end of the half pit and progressively severs the flesh of the half fruit about the pit from said end to the opposite end of the pit as the knife rotates through the half fruit, a pit retaining member having a broad substantially flat pit contacting surface, said pit retaining member being mounted for movement transverse to the surface of the half fruit and to the axis of rotation of the pitting knife to engage the surface of the pit and prevent any portion of the pit from movement toward the axis of the knife as the knife rotates through the flesh of the half fruit and emerges therefrom, and means for rotating said knife and actuating said pit retaining member in timed relation with the rotation of said knife, said actuating means moving said pit retaining member into engagement with the pit immediately after movement of said knife to a position towards said half fruit to permit such movement of said retaining member and thereafter hold said pit retaining member in contact with the pit during engagement of said knife in the half fruit and until the rear end of the knife emerges from the half fruit, said actuating means thereafter rapidly moving said pit retaining member out of the power of rotation of said knife.

7. In a fruit treating machine including a machine frame, means on the frame for feeding a pair of fruit halves with the cut faces exposed at a continuous uniform rate along a predetermined path, a traveling pitter mounted on the frame for movement to and fro parallel to said path, means for moving said pitter forwardly in synchronism with said feeding means, said travelling pitter comprising a traveling support, a pair of fruit engaging plate members secured to said support in spaced relation simultaneously to engage the exposed faces of the fruit halves in said feeding means, each of said pair of plate members having an opening therein, a pair of pitter knives mounted for movement to and fro with said support and rotatable relative thereto through the holes in the plates for movement about the seed containing sections of the fruit halves to pit the same, each pitter knife having a helical cutting edge the opposite ends of which are angularly placed about the axis rotation of the knife whereby the helical cutting edge first engages the surface of a fruit half adjacent one end thereof and progressively severs the flesh of the fruit half about the pit from said end to the opposite end of the pit as the knife rotates through the half fruit, a pit retaining member for each of said pitter knives mounted for movement transverse to the surface of the half fruit and to the axis of rotation of the associated pitter knife to engage the pit and prevent it from movement toward the axis of the knife as the knife rotates through the flesh of the half fruit and emerges therefrom, a driven chain movable at a continuous uniform rate in one direction, a sprocket engaging said chain and rotatably mounted upon said traveling support and operatively connected to said pitter knives to rotate said knives about the seed containing sections of the fruit halves upon forward movement of the traveling pitter and holding the knives against rotation during the reverse movement of the traveling pitter, and actuating means for said pit retaining members to move said pit retaining members into engagement with the associated pit during the initial movement of the pit knife about the pit and to hold it in engagement with the pit until the rear end of the knife emerges from the half fruit.

8. In a fruit treating machine including a machine frame, means on the frame for feeding a pair of fruit halves with their cut surfaces exposed and facing upwardly at a continuous uniform rate along a predetermined path, a traveling pitter mounted on the frame for movement to and fro above the fruit halves and parallel to said path, means operatively interconnecting said feeding means and said traveling pitter for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members including a pair of relatively shiftable plates having confronting edges forming apertures for exposing the pit of a fruit half engaged by the plate members with one of the plates extending into close proximity with the half pit and the aperture forming edge of said last mentioned plate conforming generally to the contour of the pit in the plane of the exposed surface of the half fruit, helicoidal pitting knives carried by said traveling support for rotation through said pit exposing apertures in said plates to sever the half pits from the fruit halves and positioned to engage in shearing relation the pit contour conforming edges of the plates as the knives emerge from the fruits, means for rotating said helicoidal pitting knives in timed relation with the movement of said traveling support, pit retaining members shiftably mounted on said traveling support, and means operatively connected to said pitter knife rotating means for moving said pit retaining members in timed relation to the rotation of said pitting knives into engagement with the pits while the helicoidal pitting knives are moving about the pits to hold the pits in the fruit halves as the knives emerge from the fruit halves on completion of the pitting cuts.

9. In a fruit treating machine including a machine frame, means on the frame for feeding a pair of fruit halves with their cut surfaces exposed and facing upwardly at a continuous uniform rate along a predetermined path, a traveling pitter mounted on the frame for movement to and fro above the fruit halves and parallel to said path, means operatively interconnecting said feeding means and said traveling pitter for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members including a pair of relatively shiftable plates having confronting edges forming apertures for exposing the pit of a fruit half engaged by the plate members with one of the plates extending into close proximity with the half pit and the aperture forming edge of said last mentioned plate conforming generally to the contour of the pit in the plane of the exposed surface of the half fruit, helicoidal pitting knives carried by said traveling support for rotation through said pit exposing apertures in said plates to sever the half pits from the fruit halves and positioned to engage in shearing relation the pit contour conforming edges of the plates as the knives emerge from the fruits, means mounting the pitting knives and plate members on the pitter support for relative movement apart in a direction transverse to the axis of rotation of the pitting knives, means for moving said knives and said plate members apart in proportion to the decrease in size of the fruit halves from a predetermined maximum size, and means for rotating said helicoidal pitting knives in timed relation with the movement of said traveling support.

10. In a fruit treating machine including a machine frame, means on the frame for feeding a pair of fruit halves with their cut surfaces exposed and facing upwardly at a continuous uniform rate along a predetermined path, a traveling pitter mounted on the frame for movement to and fro above the fruit halves and parallel to said path, means operatively interconnecting said feeding means and said traveling pitter for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members including a pair of relatively shiftable plates having confronting edges forming apertures for exposing the pit of a fruit half engaged by the plate members with one of a fruit half engaged by the proximity with the half pit and the aperture forming edge of said last mentioned plate conforming generally to the contour of the pit in the plane of the exposed surface of the half fruit, helicoidal pitting knives carried by said traveling support for rotation through said pit exposing apertures in said plates to sever the half pits from the fruit halves and positioned to engage in shearing relation the pit contour conforming edges of the plates as the knives emerge from the fruits, means mounting said plate members and said pitter knives on said traveling support for relative adjusting movement in accordance with the sizes of fruit halves presented to said pitter, said fruit feeding means including half fruit carrying cups, means for adjusting said pitting knives and said plate members relatively and including members adapted to engage the fruit cups to limit the relative adjustment of said knives and plate members in accordance with the sizes of the fruit halves, and means for rotating said helicoidal pitting knives in timed relation with the movement of said traveling support.

11. In a fruit treating machine including a machine frame, means on the frame for feeding a pair of fruit halves with their cut surfaces exposed and facing upwardly at a continuous uniform rate along a predetermined path, a traveling pitter mounted on the frame for movement to and fro above the fruit halves and parallel to said path, means operatively interconnecting said feeding means and said traveling pitter for moving said pitter forwardly in synchronism with said feeding means, said traveling pitter comprising a traveling support, a pair of fruit engaging plate members secured to said support in spaced relation simultaneously to engage the exposed faces of the fruit halves in said feeding means, each of said pair of plate members including a pair of relatively shiftable plates having confronting edges forming apertures for exposing the pit of a fruit half engaged by the plate members with one of the plates extending into close proximity with the half pit and the aperture forming edge of said last mentioned plate conforming generally to the contour of the pit in the plane of the exposed surface of the half fruit, helicoidal pitting knives carried by said traveling support for rotation through said pit exposing apertures in said plates to sever the half pits from the fruit halves and positioned to engage in shearing relation the pit contour conforming edges of the plates as the knives emerge from the fruits, means mounting said plate members and said pitter knives on said traveling support for relative adjusting movement in accordance with the sizes of fruit halves presented to said pitter, said fruit feeding means including half fruit carrying cups, resilient means for simultaneously adjusting said pitter knives and said plate members relatively and applying a compressive pressure between said plate members and said fruit cups to compress the flesh of the half fruits during the rotation of the pitting knives through the fruit halves, and means for rotating said helicoidal pitting knives in timed relation with the movement of said traveling support.

References Cited in the file of this patent

UNITED STATES PATENTS

| | | |
|---|---|---|
| 1,671,587 | Johnson | May 29, 1928 |
| 1,915,447 | Robbins | June 27, 1933 |
| 2,187,063 | Thompson et al. | Jan. 16, 1940 |
| 2,226,664 | Jepson | Dec. 31, 1940 |
| 2,376,526 | Thompson | May 22, 1945 |
| 2,443,863 | Lindley, Jr. | June 22, 1948 |
| 2,551,076 | Waters | May 1, 1951 |
| 2,568,947 | Carroll | Sept. 25, 1951 |
| 2,581,785 | DeBack et al. | Jan. 8, 1952 |
| 2,629,416 | Luther | Feb. 24, 1953 |
| 2,673,584 | Skog | Mar. 30, 1954 |

UNITED STATES PATENT OFFICE
CERTIFICATE OF CORRECTION

Patent No. 2,859,783                                                    November 11, 1958

Henry A. Skog

It is hereby certified that error appears in the printed specification of the above numbered patent requiring correction and that the said Letters Patent should read as corrected below.

Column 5, line 63, for "horizontal" read -- longitudinal --; column 15, lines 17 and 18, for "a fruit half engaged by the proximity" read -- the plates extending into close proximity --.

Signed and sealed this 24th day of February 1959.

(SEAL)
Attest:
KARL H. AXLINE
Attesting Officer

ROBERT C. WATSON
                                                                     Commissioner of Patents